(12) United States Patent
Kim et al.

(10) Patent No.: US 10,320,006 B2
(45) Date of Patent: Jun. 11, 2019

(54) INTERCONNECT INCLUDING LATTICE-TYPE CONDUCTIVE CORE, OXIDATION-RESISTANT INSULATING PART, AND OXIDATION-RESISTANT CONDUCTIVE MATERIAL LAYER FOR SOLID OXIDE FUEL CELL AND METHOD FOR MANUFACTURING THE SAME

(71) Applicant: SAMSUNG ELECTRO-MECHANICS CO., LTD., Suwon-si, Gyeonggi-do (KR)

(72) Inventors: Sung Han Kim, Suwon-si (KR); Jong Ho Chung, Suwon-si (KR); Jong Sik Yoon, Suwon-si (KR); Bon Seok Koo, Suwon-si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 185 days.

(21) Appl. No.: 15/341,460

(22) Filed: Nov. 2, 2016

(65) Prior Publication Data

US 2017/0077525 A1   Mar. 16, 2017

Related U.S. Application Data

(62) Division of application No. 13/845,026, filed on Mar. 17, 2013, now abandoned.

(30) Foreign Application Priority Data

Dec. 21, 2012   (KR) .................. 10-2012-0150564

(51) Int. Cl.
  *C04B 37/02*   (2006.01)
  *H01M 8/124*   (2016.01)
  (Continued)

(52) U.S. Cl.
  CPC ........ *H01M 8/0228* (2013.01); *C04B 37/021* (2013.01); *H01M 8/0206* (2013.01);
  (Continued)

(58) Field of Classification Search
  CPC ............ H01M 8/0228; H01M 8/0206; H01M 8/0215; C04B 37/021
  (Continued)

(56) References Cited

U.S. PATENT DOCUMENTS 6,967,065 B1   11/2005   Saitou et al.
8,173,328 B2   5/2012   Rakowski et al.
(Continued)

FOREIGN PATENT DOCUMENTS

JP   2005129281 A   5/2005
JP   2009212046 A   9/2009

OTHER PUBLICATIONS

Yamanaka et al., Machine translation of JP 2005-129281 A, May 2005.
(Continued)

*Primary Examiner* — Sean P Cullen
(74) *Attorney, Agent, or Firm* — Morgan Lewis & Bockius LLP

(57) ABSTRACT

Disclosed herein are an interconnect for a solid oxide fuel cell and a method for manufacturing the same, the interconnect including: a conductive core; an oxidation-resistant insulating part receiving therein; and an oxidation-resistant conductive material layer coated on an exposed surface of the conductive core, which is exposed to an external environment by removing a portion of the oxidation-resistant insulating part, so that the interconnect can maintain durability against high-temperature heat generated from a flat type solid oxide fuel cell for a long time and thus have a very small voltage loss due to oxidation even with the use over a (Continued)

long-time period; have no sealing problem and no delaminating problem of a coating film due to a difference in coefficient of thermal expansion; be inexpensive; and have a simple structure.

5 Claims, 3 Drawing Sheets

(51) Int. Cl.
  *H01M 8/0206* (2016.01)
  *H01M 8/0215* (2016.01)
  *H01M 8/0228* (2016.01)

(52) U.S. Cl.
  CPC ..... *H01M 8/0215* (2013.01); *C04B 2237/066* (2013.01); *C04B 2237/068* (2013.01); *C04B 2237/62* (2013.01); *C04B 2237/68* (2013.01); *H01M 2008/1293* (2013.01); *Y02E 60/50* (2013.01); *Y02E 60/525* (2013.01); *Y02P 70/56* (2015.11)

(58) Field of Classification Search
  USPC .................................................. 429/520, 535
  See application file for complete search history.

(56) References Cited

U.S. PATENT DOCUMENTS

| 2005/0170234 A1* | 8/2005 | Liu ....................... H01M 8/021 429/425 |
| 2010/0203424 A1* | 8/2010 | Ito ....................... H01M 8/0206 429/509 |
| 2010/0209802 A1 | 8/2010 | Armstrong et al. |

OTHER PUBLICATIONS

Shibata, I., Machine Translation of JP 2009-212046 A, Sep. 2009.
Non-Final Office Action U.S. Appl. No. 13/845,026 dated Jun. 10, 2015.
Non-Final Office Action U.S. Appl. No. 13/845,026 dated Feb. 29, 2016.
Final Office Action U.S. Appl. No. 13/845,026 dated Jun. 9, 2016.
Notice of Allowance U.S. Appl. No. 13/845,026 dated Sep. 6, 2016.

* cited by examiner

INTERCONNECT INCLUDING LATTICE-TYPE CONDUCTIVE CORE, OXIDATION-RESISTANT INSULATING PART, AND OXIDATION-RESISTANT CONDUCTIVE MATERIAL LAYER FOR SOLID OXIDE FUEL CELL AND METHOD FOR MANUFACTURING THE SAME

CROSS REFERENCE TO RELATED APPLICATION

This application is a Divisional Application of U.S. Ser. No. 13/845,026, filed Mar. 17, 2013, which claims the benefit of priority of Korean Patent Application No. 10-2012-0150564, filed Dec. 21, 2012. The subject matter of each is incorporated herein by reference in entirety.

BACKGROUND OF THE INVENTION

1. Technical Field

The present invention relates to an interconnect for a solid oxide fuel cell and a method for manufacturing the same.

2. Description of the Related Art

Since oil currently widely used as an energy source is limited in reserves thereof, alternative energy substituting for the petroleum is a major national and social issue. For example, interests on electricity generation using solar heat, tides, and wind, or fuel cells, rather than fossil fuels have been growing.

The above fuel cell generates electricity by using a reverse reaction of an electrolysis reaction of water, and applies technology of converting hydrogen contained a hydrocarbon based material such as natural gas, coal gas, methanol, or the like, and oxygen in the air into electricity energy through an electrochemical reaction.

Unlike the existing generation technology including several procedures such as fuel combustion, steam generation, turbine driving, generators driving, and the like, the fuel cell has no combustion procedure or driving apparatus and thus has advantages of providing high efficiency, scarcely exhausting air pollutants such as SOx, NOx, and the like, generating a small amount of carbon dioxide, and barely generating noise or vibration.

There are many various kinds of fuel cells, for example, a phosphoric acid fuel cell (PAFC), an alkaline fuel cell (AFC), a polymer electrolyte membrane fuel cell (PEMFC), a direct methanol fuel cell (DMFC), a solid oxide fuel cell (SOFC), and the like.

Among the above fuel cells, the solid oxide fuel cell (SOFC) have several advantages in that an overvoltage based on activation polarization is low and irreversible loss is small, resulting in high generation efficiency; various fuels are usable without a modifier, for example, carbon or hydrocarbon based fuel as well as hydrogen is usable and thus fuel selective width is wide; and the reaction rate at the electrode is high and thus noble metal catalysts are not needed. In addition, since very high heat is generated during the reaction, high-temperature heat may be used for modifying fuel or as an industrial or refrigerating energy source.

This solid oxide fuel cell (SOFC) has an electrode reaction such as the following reaction formula Fuel electrode: $H_2+O^{2-} \rightarrow H_2O+2e-CO+O^{2-} \rightarrow CO_2+2e-$ Air electrode: $O_2+4e- \rightarrow 2O^{2-}$ Total reaction: $H_2+CO+O_2 \rightarrow H_2O+CO_2$  [Reaction Formula]

In the fuel cell operating according to the above reaction formula, electrons reach an air electrode passing through an external circuit, and at the same time, oxygen ions generated from the air electrode reach a fuel electrode through an electrolyte, and thus at the fuel electrode, hydrogen or CO combines with oxygen ions to generate electrons and water or $CO_2$.

Meanwhile, the above solid oxide fuel cell has a unit cell composed of a fuel electrode, an electrolyte, and an air electrode, and interconnects disposed above and below the unit cell, to collect electricity generated from the unit cell and supply fuel and air to the fuel electrode and the air electrode, respectively. The interconnect is surface-connected with the unit cell, and thus directly receives heat of the unit cell.

However, the existing interconnect is formed of a metal material, and thus may be easily oxidized in a high-temperature oxidation ambience to form an oxide film, and a chrome component inside the interconnect may move the electrodes or the electrolyte, which causes a secondary phase together with the components of the electrodes or the electrolyte. The oxide film deteriorates electrical conductivity of the interconnect, resulting in decreasing electricity collecting efficiency, and in particular, the formation of the secondary phase due to the chrome component significantly deteriorates performances of the electrodes and the electrolyte.

In order to solve the foregoing problems, an oxidation-resistant coating layer or a film layer may be formed on the interconnect. However, the oxidation-resistant coating layer or the film layer has a difference in coefficient of thermal expansion from the inner interconnect, and thus causes delamination from the interconnect within a short time. Moreover, the oxidation-resistant coating layer or the film layer also has a difference in coefficient of thermal expansion from a glass sealing agent on a lateral surface, which causes sealing problems.

For example, U.S. Pat. No. 8,173,328 (Interconnects for Solid Oxide Fuel Cells and Ferritic Stainless Steels Adapted for Use with Solid Oxide Fuel Cells) discloses that oxidation is prevented through surface treatment of a metal interconnect having holes and gas channels, but this technology cannot completely prevent high-temperature oxidation of a metal material and cannot solve the problem that the chrome component in the terrific stainless steel reacts with the components of the fuel cell, which deteriorates durability of the cell.

SUMMARY OF THE INVENTION

The present invention has been made in an effort to provide an interconnect for a solid oxide fuel cell capable of maintaining durability against high-temperature heat generated from a flat type solid oxide fuel cell for a long time and thus having a very small voltage loss due to oxidation even with the use over a long-time period; having no sealing problem and no delaminating problem of a coating film due to a difference in coefficient of thermal expansion; being inexpensive; and having a simple structure, and a method for manufacturing the interconnect.

According to a preferred embodiment of the present invention, there is provided an interconnect for a solid oxide fuel cell, the interconnect including: a conductive core formed of an electroconductive material and taking the form of a lattice type plate; an oxidation-resistant insulating part receiving and wrapping the conductive core therein, to thereby prevent oxidation of the conductive core; and an oxidation-resistant conductive material layer coated on an exposed surface of the conductive core, which is exposed to an external environment by removing a portion of the oxidation-resistant insulating part, the oxidation-resistant conductive material layer being electrically connected with an electrode of an external fuel cell.

The conductive core may include: a plurality of horizontal parts each having a predetermined cross section and extended in a length direction, and in parallel spaced apart from each other; and a plurality of vertical parts disposed orthogonal with the horizontal parts and in parallel spaced apart from each other, the vertical parts each having a predetermined cross section.

The horizontal part and the vertical part each may take the form of an I-beam, having flat upper and lower surfaces, upper and lower surfaces of the horizontal part being stepped with respect to upper and lower surfaces of the vertical part.

The conductive core may be formed of any one of a metal, a metal alloy, and a metal and ceramic alloy, having a melting point of 1000□ or higher.

The oxidation-resistant insulating part may be formed of any one or a mixture of one or more of yttria stabilized zirconia (YSZ), scandia stabilized zirconia (ScSZ), gadolinia doped ceria (GDC), and LSGM $(La_{0.8}Sr_{0.2}Ga_{0.8}Mg_{0.2}O_{3-\delta})$.

The oxidation-resistant conductive material layer may be formed of a noble metal.

The oxidation-resistant insulating part may include some or all of components constituting an electrolyte used in the solid oxide fuel cell.

The oxidation-resistant insulating part may include some or all of components constituting a sealing member used in the solid oxide fuel cell.

The oxidation-resistant insulating part may include some or all of components constituting a sealing member used in the solid oxide fuel cell and some or all of components constituting an electrolyte used in the solid oxide fuel cell.

The interconnect may further include a middle layer laminated between the conductive core and the oxidation-resistant insulating part, to prevent delamination of the oxidation-resistant insulating part from the conductive core.

The middle layer may be formed of a mixture of components of the conductive core and the oxidation-resistant insulating part.

According to a preferred embodiment of the present invention, there is provided a method for manufacturing an interconnect for a solid oxide fuel cell, the method including: forming a conductive core in a form of a lattice type plate by sintering-molding a conductive powder having a melting point of 1000□ or higher; molding an oxidation-resistant insulating part by wrapping the conductive core in an oxidation-resistant insulating ceramic powder, followed by sintering; exposing the conductive core to an external environment by mechanically processing a portion of the oxidation-resistant insulating part to expose a portion of the conductive core, which is to be connected with an electrode of the fuel cell; and coating an oxidation-resistant conductive material layer on an exposed portion of the conductive core by coating an oxidation-resistant conductive material on the exposed portion of the conductive core.

The method may further include, before the molding of the oxidation-resistant insulating part, forming a middle layer by coating a mixture of the conductive powder and the oxidation-resistant insulating ceramic powder on a surface of the conductive core.

Here, in the exposing of the conductive core, the portion of the oxidation-resistant insulating part may be removed through a polishing process.

Here, in the coating of the oxidation-resistant conductive material layer, the oxidation-resistant conductive material layer may be coated on the exposed portion of the conductive core in a deposition manner.

Here, a material to be deposited used in the lamination manner may include noble metals.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
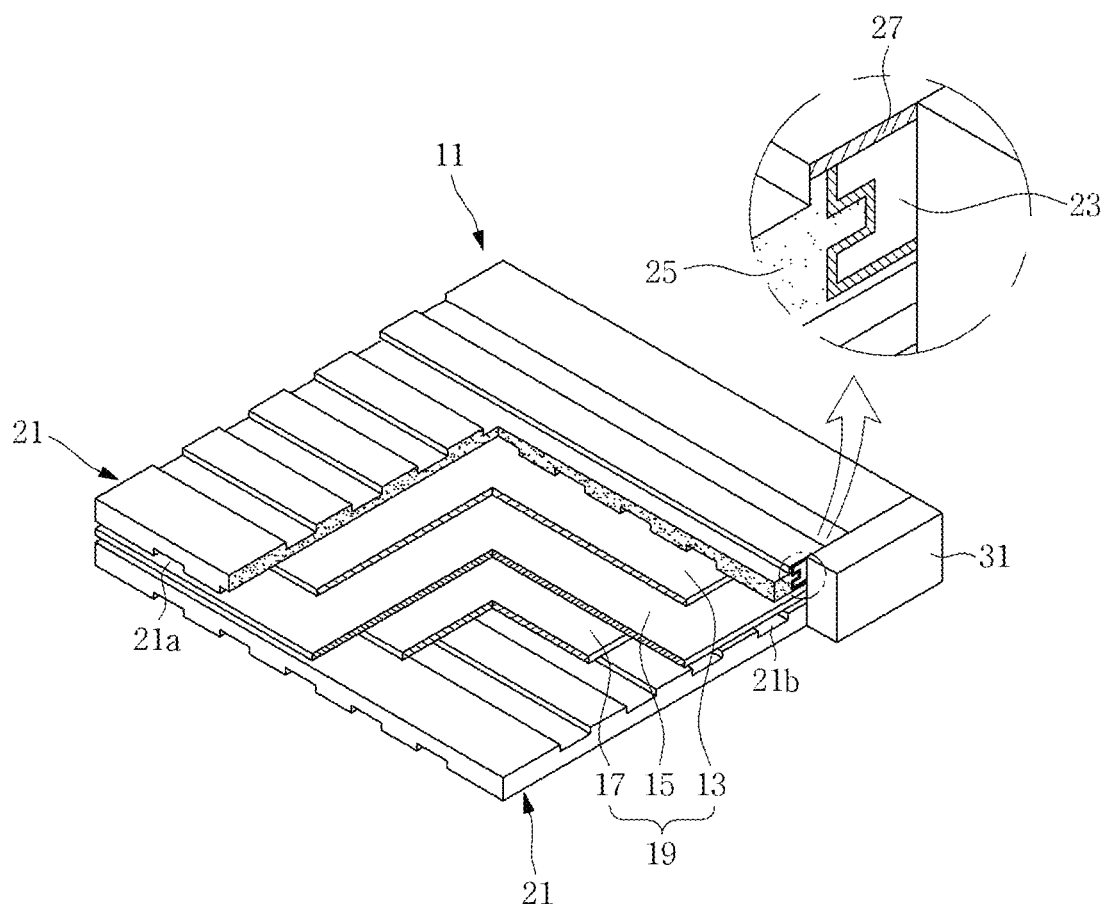
FIG. 1 is a partial cut perspective view of a fuel cell to which an interconnect for a solid oxide fuel cell according to a preferred embodiment of the present invention is applied.

The objects, features and advantages of the present invention will be more clearly understood from the following detailed description of the preferred embodiments taken in conjunction with the accompanying drawings. Throughout the accompanying drawings, the same reference numerals are used to designate the same or similar components, and redundant descriptions thereof are omitted. Further, in the following description, the terms "first", "second", "one side", "the other side" and the like are used to differentiate a certain component from other components, but the configuration of such components should not be construed to be limited by the terms. Further, in the description of the present invention, when it is determined that the detailed description of the related art would obscure the gist of the present invention, the description thereof will be omitted.

Hereinafter, preferred embodiments of the present invention will be described in detail with reference to the attached drawings.

FIG. 1 is a partial cut perspective view of a fuel cell 11 to which an interconnect 21 for a solid oxide fuel cell according to a preferred embodiment of the present invention is applied.

As shown in the drawing, interconnects 21 according to the present preferred embodiment may be closely contacted with upper and lower surfaces of a unit cell 19. The interconnect 21 functions to collect electricity generated from the unit cell 19 and respectively provide air and fuel to the unit cell 19.

The unit cell 19 is composed of an electrolyte 15 and an air electrode 13 and a fuel electrode 17 closely fixed to upper and lower surfaces of the electrolyte 15, respectively. The fuel electrode 17 receives the fuel supplied through fuel passages 21b formed in the interconnect 21 positioned below on the drawing. In addition, the air electrode 13 receives the air provided through air passages 21a prepared in the interconnect 21 positioned above.

The interconnects 21 are arranged above and below with one unit cell 19 interposed therebetween, and edge portions thereof are sealed by a sealing member 31. The sealing member 31 blocks the fuel and air from leaking out.

Meanwhile, the interconnect 21 is composed of a conductive core 23 formed of an electroconductive material and takes the form of a lattice type plate; an oxidation-resistant insulating ceramic layer 25 (as an oxidation-resistant insulating part) receiving and wrapping the conductive core 23 therein to thereby prevent oxidation of the conductive core 23; and an oxidation-resistant conductive material layer 27 deposition-coated on a portion of the conductive core 23, which is surface-contacted with the unit cell 19.

In some cases, a middle layer (29 in FIG. 5) may be further provided between the oxidation-resistant insulating ceramic layer 25 and the conductive core 23.

Figure 2:
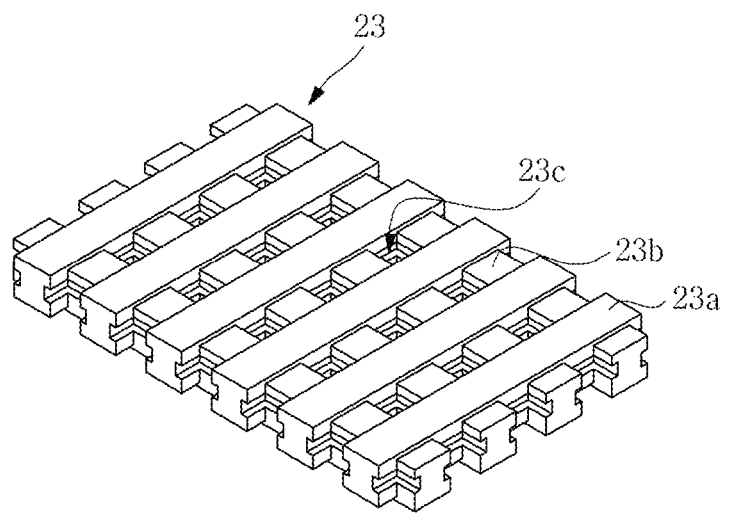
FIG. 2 is a perspective view of a conductive core forming a framework of the interconnect shown in FIG. 1.

Fundamentally, the conductive core 23 is formed of any one of a metal having a melting point of approximately 1000□ or higher, a metal alloy, or a metal and ceramic alloy. The conductive core 23 functions as a framework of the interconnect 21, and a structure thereof is shown in FIG. 2.

In addition, the oxidation-resistant insulating ceramic layer 25 functions to wrap and protect the conductive core 23, and may be formed of any one or a mixture of one or more of yttria stabilized zirconia (YSZ), scandia stabilized zirconia (ScSZ), gadolinia doped ceria (GDC), and LSGM ($La_{0.8}Sr_{0.2}Ga_{0.8}Mg_{0.2}O_{3-\delta}$).

Particularly, the same material may be preferably applied to the sealing member 31, the oxidation-resistant insulating ceramic layer 25, and the electrolyte 15. That is, in order to maximally improve thermal stability of the sealing member 31 to promote long-term durability of stack and solid oxide fuel cells, the sealing member 31, the oxidation-resistant insulating ceramic layer 25, and the electrolyte 15 are allowed to have the same or similar components, to thereby induce the binding by the same material.

The oxidation-resistant conductive material layer 27 is formed of a material having good high-temperature oxidation resistance and electric conductivity, and may be formed of a noble metal such as gold, platinum, or palladium. This oxidation-resistant conductive material layer 27 is coated on an exposed surface of the conductive core 23, which is exposed to an external environment by removing a portion of the oxidation-resistant insulating ceramic layer 25 (23d in FIG. 3), and thus is electrically contacted with an electrode of an external fuel cell.

The oxidation-resistant conductive material layer 27 functions to electrically connect the conductive core 23 to the electrode of the unit cell 19 and prevent the conductive core 23 from being oxidized.

FIG. 2 is a perspective view of the conductive core 23 forming a framework of the interconnect 21 shown in FIG. 1.

As shown in the drawing, the conductive core 23 is composed of a plurality of horizontal parts 23a taking the form of an I-beam and in parallel spaced apart from each other, and a plurality of vertical parts 23b taking the form of an I-beam like the horizontal part and arranged orthogonal with the horizontal parts 23a.

The conductive core 23 is formed by sintering-molding a powder having a melting point of approximately 1000□ or higher and having conductivity, as one body, through a core forming step to be described below. The conductive core 23 takes the form of a lattice, entirely, and has a plurality of hollow portions 23c.

In particular, the horizontal part 23a is located at a relatively higher position than the vertical part 23b. That is, an upper surface of the horizontal part 23a is stepped higher than an upper surface of the vertical part 23b (on the drawing), and a lower surface of the horizontal part 23a is more concave than a lower surface of the vertical part 23b.

With respect to an upper surface of the conductive core 23, a space between neighboring horizontal parts 23a forms an air passage 21a. Like this, with respect to a lower surface of the conductive core 23, a space between neighboring vertical parts 23b forms a fuel passage 21b through which fuel is supplied.

Figure 3:
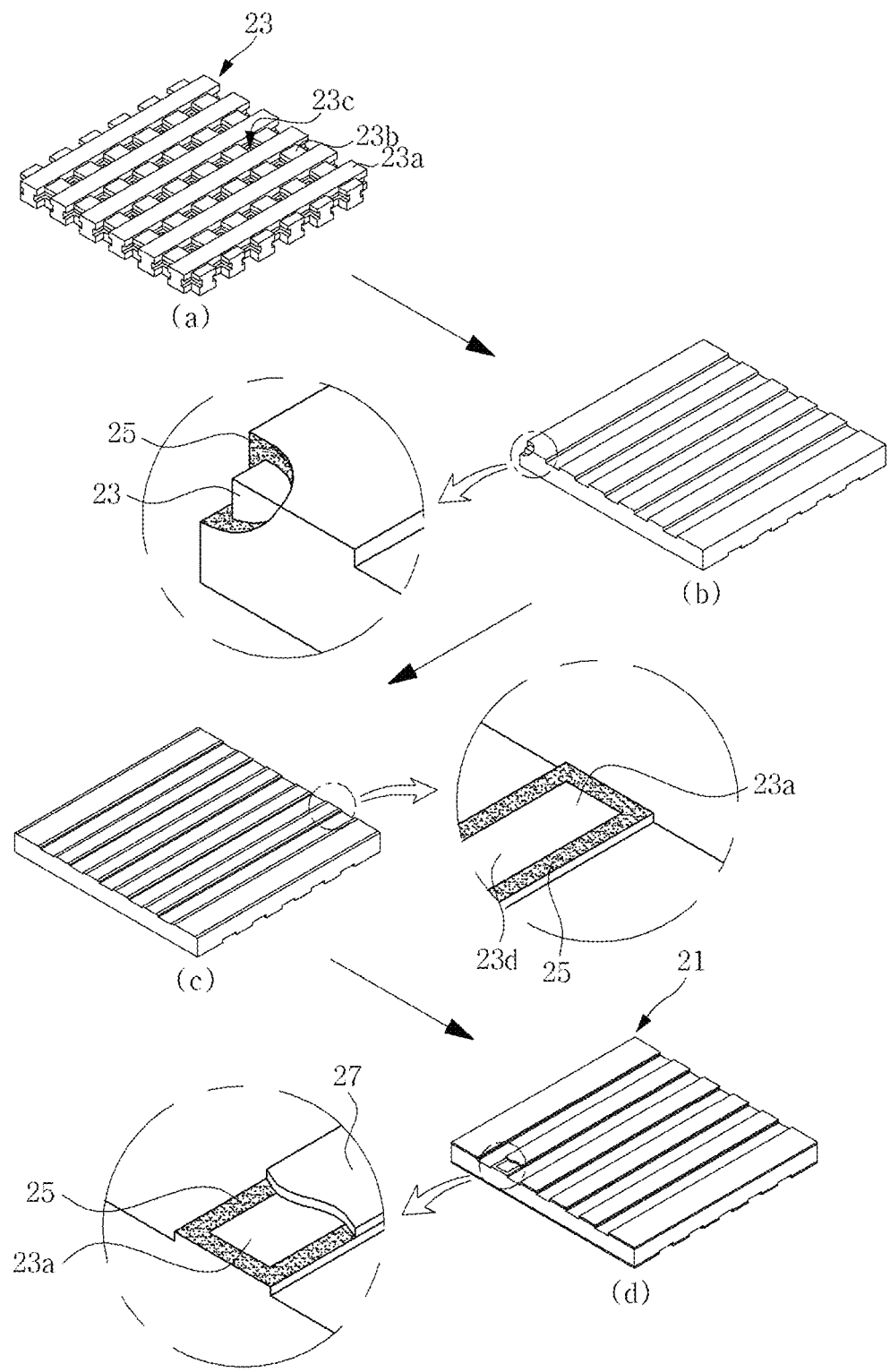
FIG. 3 is a schematic diagram showing a method for manufacturing the interconnect shown in FIG. 1.
Figure 4:
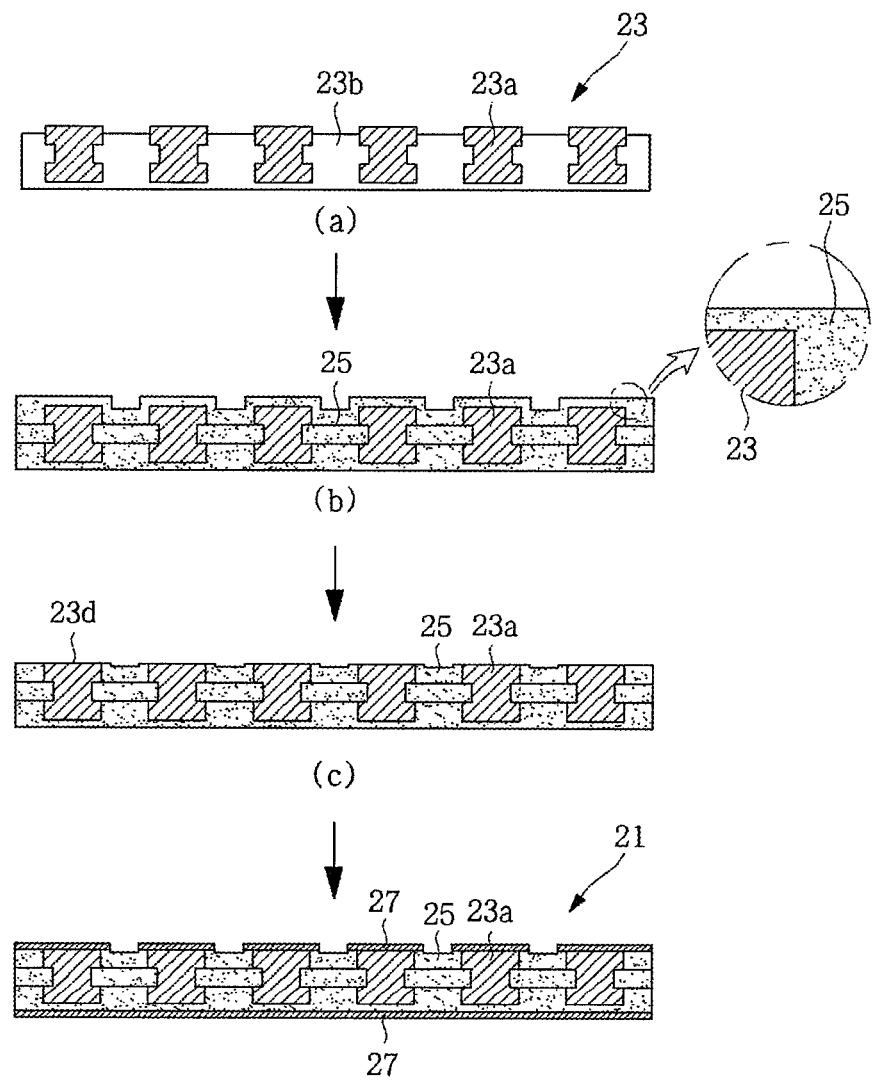
FIG. 4 is a view for explaining the method for manufacturing the interconnect for the solid oxide fuel cell according to the preferred embodiment of the present invention.

FIGS. 3 and 4 are views for explaining a method for manufacturing the interconnect 21 for the solid oxide fuel cell according to the preferred embodiment of the present invention.

Basically, the method for manufacturing the interconnect 21 for the solid oxide fuel cell according to the present preferred embodiment may include a core forming step, an oxidation-resistant insulating part molding step, a core exposing step, and a coating step.

As for the core forming step, the conductive core 23 shown in FIGS. 3A and 4A is sintered-molded. As described above, a material used for core forming is a metal, a metal alloy, or a metal and ceramic alloy, in a powder type. The powder is input into a mold for sintering-molding, which is previously made to the conductive core 23, and strong pressure and heat are applied thereto, to thereby obtain the conductive core 23.

As for the oxidation-resistant insulating part molding step continuing after the conductive core 23 is made by the above process, the conductive core 23 is completely wrapped by an oxidation-resistant insulating ceramic powder, followed by pressing and sintering. Here, as shown in FIG. 4B, an inside of the hollow portions 23c are, of course, completely filled with a ceramic powder.

Particularly, the thicknesses of the ceramic powder formed on the upper and lower surfaces of the horizontal part 23a and the vertical part 23b are the same. That is, even though the oxidation-resistant insulating ceramic layer 25 is laminated by using the ceramic powder, the step height between the horizontal part 23a and the vertical part 23b is continuously maintained.

When the laminating of the oxidation-resistant insulating ceramic layer 25 is completed through the above process, the core exposing step is carried out by removing a portion of the oxidation-resistant insulating ceramic layer 25, which is coated on the horizontal parts 23a of the upper surface of the conductive core 23, and a portion of the oxidation-resistant insulating ceramic layer 25, which is coated on the vertical parts 23b of the lower surface of the conductive core 23, to thereby expose the conductive core 23. The exposed surface 23d is secured by the above process.

Particularly, the core exposing step is carried out by a polishing process. That is, the ceramic layer is removed by using a polishing apparatus frequently employed for surface grinding or polishing, to thereby secure the exposed surface 23d. Since the exposed surface 23d is very smooth and has no impurity by applying this polishing manner, the deposition of the oxidation-resistant conductive material to be described below may be effectively carried out With respect to the oxidation-resistant conductive material coating step, an oxidation-resistant conductive material layer (27 in FIG. 3D and 27 in FIG. 4D) is deposited on the exposed surface 23*d*. As described above, a noble metal such as palladium, platinum, or gold, having excellent oxidation resistance and electrical conductivity at a high temperature may be used as the oxidation-resistant conductive material.

The oxidation-resistant conductive material functions to prevent oxidation of the exposed surface 23*d* by completely covering the exposed surface 23*d*, and electrically connect an electrode of an outside and the conductive core 23. The manufacturing process of the interconnect 21 is finished through the oxidation-resistant conductive material coating step.

Figure 5:
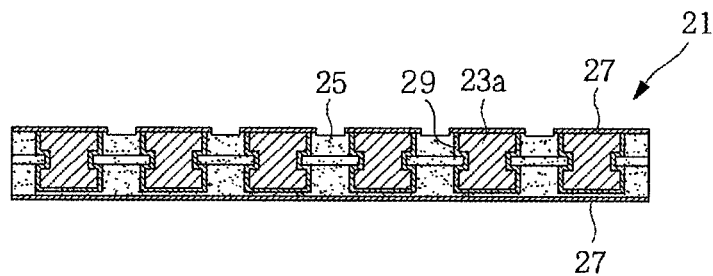
FIG. 5 is a cross-sectional view showing another example of the interconnect for the solid oxide fuel cell according to the preferred embodiment of the present invention.

FIG. 5 is a cross-sectional view showing another example of the interconnect for the solid oxide fuel cell according to the preferred embodiment of the present invention.

Referring to FIG. 5, a middle layer 29 may be laminated between the oxidation-resistant insulating ceramic layer 25 and the conductive core 23. The middle layer 29 is coated on the surface of the conductive core 23 before the oxidation-resistant insulating ceramic layer 25 is applied, and functions to suppress the delamination of the oxidation-resistant insulating ceramic layer 25 from the conductive core 23.

This middle layer 29 is made by mixing the components of the conductive core 23 and the oxidation-resistant insulating ceramic layer 25, in order to meet the coefficients of thermal expansion of the conductive core 23 and the oxidation-resistant insulating ceramic layer 25 to levels similar to each other. That is, a material constituting the conductive core 23 and a material constituting the oxidation-resistant insulating ceramic layer 25 are mixed at a predetermined ratio. The composition ratio is basically about 5:5, but in some cases, may be variously changed.

The middle layer 29 is formed through a middle layer forming step. That is, after the forming of the conductive core 23 is finished through the core forming step, the middle layer 29 is sintered-laminated on the surface of the conductive core 23.

As set forth above, the interconnect for the solid oxide fuel cell according to the present invention can maintain durability against high-temperature heat generated from a flat type solid oxide fuel cell for a long time and thus have a very small voltage loss due to oxidation even with the use over a long-time period; have no sealing problem and no delaminating problem of the coating film due to a difference in coefficient of thermal expansion; be inexpensive; and have a simple structure.

Although the embodiments of the present invention have been disclosed for illustrative purposes, it will be appreciated that the present invention is not limited thereto, and those skilled in the art will appreciate that various modifications, additions and substitutions are possible, without departing from the scope and spirit of the invention.

Accordingly, any and all modifications, variations or equivalent arrangements should be considered to be within the scope of the invention, and the detailed scope of the invention will be disclosed by the accompanying claims.

What is claimed is:

1. A method for manufacturing an interconnect for a solid oxide fuel cell, the method comprising:

forming a conductive core in a form of a lattice type plate having a plurality of hollow portions by sintering-molding a conductive powder having a melting point of 1000° C. or higher;

molding an oxidation-resistant insulating part by wrapping the conductive core in an oxidation-resistant insulating ceramic powder to fill the hollow portions with the oxidation-resistant insulating ceramic powder, followed by sintering;

exposing the conductive core to an external environment by mechanically processing a portion of the oxidation-resistant insulating part to expose a portion of the conductive core, which is to be connected with an electrode of the fuel cell; and coating an oxidation-resistant conductive material layer on an exposed portion of the conductive core by coating an oxidation-resistant conductive material on the exposed portion of the conductive core.

2. The method as set forth in claim 1, further comprising, before the molding of the oxidation-resistant insulating part, forming a middle layer by coating a mixture of the conductive powder and the oxidation-resistant insulating ceramic powder on a surface of the conductive core.

3. The method as set forth in claim 1, wherein in the exposing of the conductive core, the portion of the oxidation-resistant insulating part is removed through a polishing process.

4. The method as set forth in claim 1, wherein in the coating of the oxidation-resistant conductive material layer, the oxidation-resistant conductive material layer is coated on the exposed portion of the conductive core in a deposition manner.

5. The method as set forth in claim 4, wherein the oxidation-resistant conductive material to be deposited used in a lamination manner includes noble metals.

\* \* \* \* \*